US011855266B2

(12) United States Patent
Butterfield et al.

(10) Patent No.: US 11,855,266 B2
(45) Date of Patent: Dec. 26, 2023

(54) CYLINDRICAL BATTERY CELL PACKAGING AND COOLING CONFIGURATION

(71) Applicant: Rivian IP Holdings, LLC, Plymouth, MI (US)

(72) Inventors: Kyle William Butterfield, Rancho Santa Margarita, CA (US); Tyler David Collins, Irvine, CA (US); Nathaniel Christopher Wynn, Newport Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 52 days.

(21) Appl. No.: 17/140,742

(22) Filed: Jan. 4, 2021

(65) Prior Publication Data

US 2021/0126301 A1    Apr. 29, 2021

Related U.S. Application Data

(63) Continuation of application No. 16/115,156, filed on Aug. 28, 2018, now Pat. No. 10,886,580.

(51) Int. Cl.
*H01M 10/613* (2014.01)
*H01M 10/643* (2014.01)
(Continued)

(52) U.S. Cl.
CPC .......... *H01M 10/613* (2015.04); *B60L 50/64* (2019.02); *H01M 10/0422* (2013.01);
(Continued)

(58) Field of Classification Search
None
See application file for complete search history.

(56) References Cited

U.S. PATENT DOCUMENTS 9,876,212 B2    1/2018  Winter
2009/0220850 A1*  9/2009  Bitsche .................. H01M 10/52
429/50
(Continued)

FOREIGN PATENT DOCUMENTS

CN        107834131 A      3/2018
DE    102008059956 A1 *  6/2010   ........ H01M 10/0525
(Continued)

OTHER PUBLICATIONS www.espacenet.com machine translation of DE 102008059956A1. (Year: 2008).*

(Continued)

*Primary Examiner* — Gregg Cantelmo
(74) *Attorney, Agent, or Firm* — Haley Guiliano LLP

(57) ABSTRACT

Systems and methods that provide improved cooling for batteries are disclosed. A battery system according to the present disclosure may include a cooling plate, one or more battery cells coupled to one surface of the cooling plate, and one or more battery cells coupled to the opposite surface of the cooling plate. The cooling plate and corresponding batteries may be included in a battery module, and multiple battery modules electrically connected may make up a battery pack. The cooling plates may comprise channels for cooling fluid, which may be provided to the plates in parallel from a cooling fluid source. Cooling the battery cells at the ends of the cells, where they are coupled to the cooling plate, may advantageously provide one or more of improved energy density, thermal management, and safety.

23 Claims, 8 Drawing Sheets

(51) Int. Cl.
  *H01M 10/6555* (2014.01)
  *H01M 10/6557* (2014.01)
  *H01M 10/625* (2014.01)
  *H01M 10/6567* (2014.01)
  *H01M 10/04* (2006.01)
  *H01M 50/30* (2021.01)
  *H01M 50/107* (2021.01)
  *B60L 50/64* (2019.01)
  *H01M 50/24* (2021.01)
  *H01M 50/213* (2021.01)
  *H01M 50/249* (2021.01)
  *H01M 50/179* (2021.01)

(52) U.S. Cl.
  CPC ....... *H01M 10/625* (2015.04); *H01M 10/643* (2015.04); *H01M 10/6555* (2015.04); *H01M 10/6557* (2015.04); *H01M 10/6567* (2015.04); *H01M 50/107* (2021.01); *H01M 50/179* (2021.01); *H01M 50/213* (2021.01); *H01M 50/24* (2021.01); *H01M 50/249* (2021.01); *H01M 50/30* (2021.01)

(56) References Cited

U.S. PATENT DOCUMENTS

| | | |
|---|---|---|
| 2011/0045334 A1 | 2/2011 | Meintschel |
| 2011/0171515 A1* | 7/2011 | Itoi .................... H01M 50/503 429/158 |
| 2012/0028099 A1 | 2/2012 | Aoki |
| 2012/0107663 A1* | 5/2012 | Burgers .............. H01M 10/613 429/120 |
| 2012/0270081 A1 | 10/2012 | Horii et al. |
| 2012/0315529 A1 | 12/2012 | Jin |
| 2013/0011713 A1 | 1/2013 | Harada et al. |
| 2014/0255748 A1 | 9/2014 | Jan et al. |
| 2014/0322582 A1 | 10/2014 | Ruter et al. |
| 2015/0140388 A1 | 5/2015 | Harada et al. |
| 2017/0005380 A1* | 1/2017 | Harris ................. H01M 50/227 327/115 |
| 2017/0222283 A1* | 8/2017 | Choi ................. H01M 10/6569 |
| 2017/0288285 A1 | 10/2017 | Buckhout et al. |
| 2017/0288286 A1* | 10/2017 | Buckhout ........... H01M 50/213 |
| 2018/0131028 A1* | 5/2018 | Offutt ................... H01M 10/04 |
| 2018/0205125 A1* | 7/2018 | Burgers .............. H01M 10/613 |

FOREIGN PATENT DOCUMENTS

| | | | |
|---|---|---|---|
| DE | 102015107170 A1 * | 11/2016 | ......... H01M 10/613 |
| EP | 2413421 | 2/2012 | |
| WO | WO-2007118437 A1 * | 10/2007 | ......... H01M 10/613 |

OTHER PUBLICATIONS

International Search Report and Written Opinion in Application No. PCT/US2019/048631, dated Nov. 13, 2019 (13 pages).

\* cited by examiner

CYLINDRICAL BATTERY CELL PACKAGING AND COOLING CONFIGURATION

CROSS-REFERENCE TO RELATED APPLICATIONS

This application is a continuation of U.S. patent application Ser. No. 16/115,156 filed Aug. 28, 2018, which issued as U.S. Pat. No. 10,886,580, the disclosure of which is hereby incorporated by reference herein in its entirety.

BACKGROUND

Current electric vehicle platforms typically package a large number of battery cells into modules. The battery cells generate heat and typically require cooling to maintain the cells' safe operation and longevity. It is known in the art to run cooling tubes between cylindrical battery cells within a module such that the tubes cool a portion of the sides of the cells. In this configuration, the cooling tubes take up space within the module and limit how tightly the cells can be packed within the module, thereby limiting energy density. It would be advantageous to provide an improved cooling configuration for battery cells.

SUMMARY

Systems and methods are disclosed herein that provide improved cooling for batteries. The batteries of the present disclosure may provide one or more of improved energy density, thermal management, and safety. A battery system according to the present disclosure may include a cooling plate having a first cooling surface and a second opposite cooling surface. The battery system may also include two or more battery cells, where each battery cell comprises a first end, a second end, and a longitudinal axis passing through the first end and second end. The first end of a first battery cell is coupled to the first surface of the cooling plate and the first end of a second battery cell is coupled to the second surface of the cooling plate, where the first battery cell and the second battery cell are oriented in opposite directions. In some embodiments, the first ends of the first battery cell and the second battery cell may be coupled to the cooling plate with a respective coupling element (e.g., an adhesive).

In some embodiments, the cooling plate may have an input port and an output port, where cooling fluid may enter and exit the cooling plate, respectively. The cooling plate may be a generally rectangular shape having four edges, and the input and output ports may be located near an edge of the rectangular shape. The cooling plate may have a plurality of cooling channels through which the cooling fluid can pass through from the input port to the output port. In some embodiments, the battery system may have an additional cooling plate configured to cool additional battery cells, where the cooling plates are coupled in parallel to a source of cooling fluid.

In some embodiments, the first battery cell and the second battery cell may each be a cylindrical shape. The first ends of the first and second battery cells may each comprise a negative face and the second ends of the first and second battery cells may each comprise a positive face.

In some embodiments, the first and second battery cells may each be coupled to a respective positive electrical connector at the center portions of the second ends of the cells. The cells may each be coupled to a respective negative electrical connector at the rim portions of the second ends of the cells.

In some embodiments, the second ends of the first and second battery cells may each have a vent configured to release gas during a thermal event, for example, in the case of cell overcharging or failure.

In some embodiments, the battery system may include multiple first battery cells that are coupled to the first surface of the cooling plate and multiple second battery cells that are coupled to the second surface of the cooling plate. The battery cells on each side of the cooling plate may be arranged in a plurality of rows, where each row may be offset from an adjacent row to, for example, increase packing density of the cells.

In some embodiments, the first battery cells may be electrically connected in parallel and the second battery cells may be electrically connected in parallel.

In some embodiments, the first battery cells may have subgroups, where the battery cells within each subgroup are electrically connected in parallel, and where the subgroups are electrically connected in series. Similarly, the second battery cells may have subgroups, where the battery cells within each subgroup are electrically connected in parallel, and where the subgroups are electrically connected in series.

In some embodiments, the longitudinal axes of the first and second battery cells may be parallel, and the first end of the first battery cell may be spaced apart from the first end of the second battery cell a distance less than 8 millimeters in a direction parallel to the longitudinal axes of the first and second battery cells.

In some embodiments, the battery system may have a plurality of battery modules, where each of the plurality of battery modules may include a cooling plate, a first battery cell, and a second battery cell, and where the plurality of battery modules may be electrically connected in series or parallel to form a battery pack.

In some embodiments, the first battery cell and the second battery cell may each have a thermal conductivity that is greater in the longitudinal direction than in a direction perpendicular to the longitudinal direction.

In some embodiments, a method of manufacturing a battery system is used to provide improved cooling for batteries. The method may include providing a cooling plate having a first cooling surface and a second opposite cooling surface, as well as providing two or more battery cells, where each battery cell comprises a first end, a second end, and a longitudinal axis passing through the first end and second end. The method may further include coupling the first end of the first battery cell to the first surface of the cooling plate and the first end of the second battery cell to the second surface of the cooling plate, where the first and second battery cells are oriented in opposite directions.

In some embodiments, a method of operating a battery system provides improved cooling. The method may include supplying cooling fluid to the input port of the cooling plate. The method may further include absorbing heat, in the cooling fluid, from the ends of battery cells on each side of the cooling plate, thereby generating heated cooling fluid in the cooling plate. The method may further include discharging the heated cooling fluid through the output port of the cooling plate, thereby removing heat generated from the battery cells.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Systems and methods are disclosed herein that provide improved cooling for batteries. In the present disclosure, battery cells are coupled at the ends of the cells to opposite sides of a cooling plate. There may be one or more battery cells on each side of the cooling plate. When multiple battery cells are used on each side, they may be arranged in rows that are offset from each other to increase packing density (e.g., in a hexagonal close packed arrangement). Each battery cell may have a vent on the end not coupled to the cooling plate that is configured to release gas during a thermal event, such as cell overcharging or failure. The battery cells may each have one end corresponding to a positive face and one end corresponding to a negative face of the cell. There may also be positive and negative electrical connectors coupled to center and rim portions of the battery cells at one end to enable easier connections to busbars. Groups of battery cells may be electrically connected in series or parallel; in some cases, one subgroup of battery cells connected in parallel may be connected to another subgroup of battery cells in series.

The cooling plate in the present disclosure may have good thermal coupling but be electrically isolated and non-conductive. The cooling plate may contain a cooling fluid such as ethylene glycol and water solution, propylene glycol and water solution, methanol solution, etc. The cooling plate may be a generally rectangular shape, with an input port for the cooling fluid to enter the cooling plate and an output port for the cooling fluid to exit the cooling plate. Multiple battery modules that each comprise a cooling plate and battery cells may be coupled in parallel to a source of cooling fluid.

Figure 1:
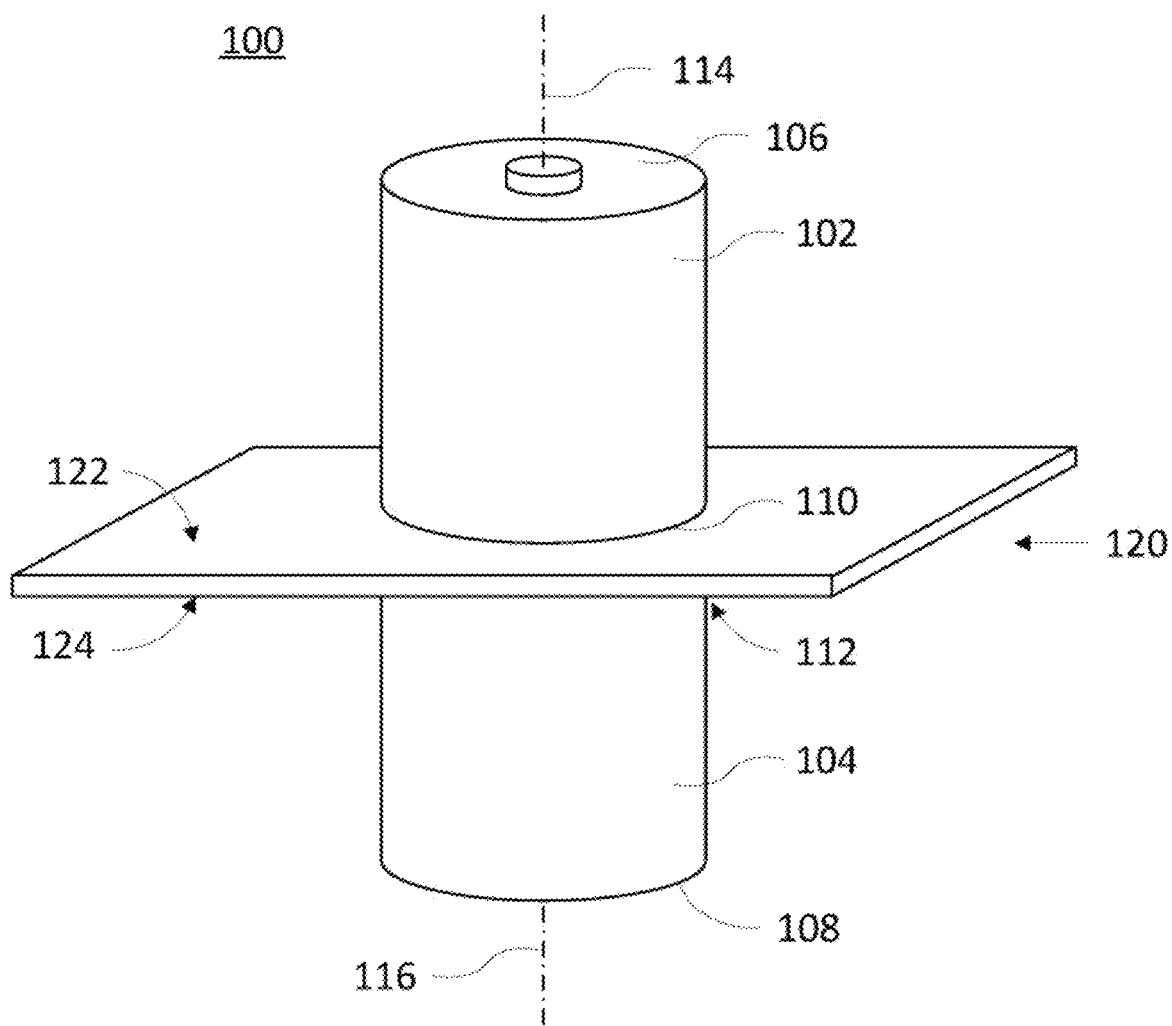
FIG. 1 shows a first battery cell and a second battery cell coupled to a cooling plate in a cooling configuration in accordance with some embodiments of the present disclosure.

FIG. 1 shows a first battery cell 102 and a second battery cell 104 coupled to a cooling plate 120 in cooling configuration 100 in accordance with some embodiments of the present disclosure. Both battery cells comprise a first end, a second end, and a longitudinal axis passing through the first and second end of the cell. In some embodiments, the battery cells may be cylindrically shaped as shown. In some embodiments, the battery cells may be prismatic in shape (e.g., rectangular). As shown, first end 110 of first battery cell 102 is coupled to a first side 122 of cooling plate 120. First end 112 of second battery cell 104 is coupled to a second opposite side 124 of cooling plate 120. As arranged, first battery cell 102 and second battery cell 104 are oriented in opposite directions. Battery cells 102 and 104 may be coupled to cooling plate 120 using any suitable coupling element. In some embodiments, the coupling element may be an adhesive, a nonconductive shroud, or both. The coupling element may provide good thermal conductivity between battery cells 102 and 104 and cooling plate 120.

First end 110 of first battery cell 102 and first end 112 of second battery cell 104 may each comprise a negative face of the cell. In some embodiments, the negative terminal may extend up the side of the battery to the rim of the other end. Second ends 106 and 108 of battery cells 102 and 104 may each comprise a positive face of the cell and may each comprise a vent configured to release gas during a thermal event, such as cell overcharging or failure. Second ends 106 and 108 may also include a sealing gasket between the center portion and the outer rim to electrically isolate the positive terminal from the negative terminal. In some embodiments, battery cells 102 and 104 are lithium ion batteries. Lithium ion battery cells may comprise four sheets of material, a positive electrode sheet, a negative electrode sheet, and two separator sheets (e.g., microperforated plastic), rolled into a spiral. Tabs may connect the positive electrode sheet to the positive face and the negative electrode sheet to the negative face. In some embodiments, the battery cells each comprise a thermal conductivity that is greater in the longitudinal direction than a direction perpendicular to the longitudinal direction. For example, the spiraled sheets of lithium ion batteries typically have a greater thermal conductivity in the longitudinal direction.

In cooling configuration 100, longitudinal axis 114 of first battery cell 102 and longitudinal axis 116 of second battery cell 104 are parallel with each other. The first and second battery cells may be oriented so that their longitudinal axes are coincident, as shown, or they may be offset from each other. First end 110 of first battery cell 102 may be spaced apart from first end 112 of second battery cell 104 a distance equal to or greater than the thickness of cooling plate 120 in a direction parallel to the longitudinal axes of the first and second battery cells. In some embodiments, the thickness of cooling plate 120 is approximately 5 millimeters. It will be understood that this is merely exemplary and any suitable thickness can be used. In some embodiments, the first ends of battery cells are adjacent to the sides of cooling plate 120 or within 1, 2, or 3 millimeters of the sides of cooling plate 120. In some embodiments, the distance between the first ends of the battery cells is less than 8 millimeters. In some embodiments, the distance between the first ends of the battery cells is approximately 5, 6, or 7 millimeters. Accordingly, by using a cooling plate and orienting the battery cells on either side of the cooling plate in opposite orientations, the overall height of the battery system can be reduced or minimized. Any suitable cooling plate may be used in accordance with the present disclosure. In some embodiments, a liquid cooled cooling plate may be used. In some embodiments, a spreader cooling plate (e.g., a heat pipe cooling plate) may be used.

Figure 2:
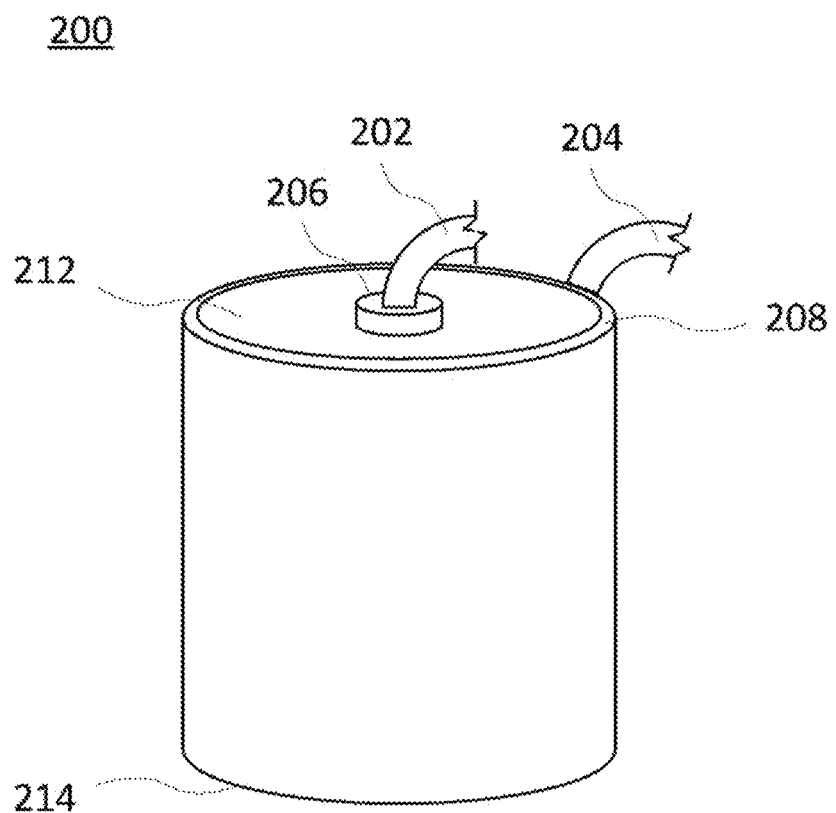
FIG. 2 shows a battery cell coupled to a positive electrical connector and a negative electrical connector in accordance with some embodiments of the present disclosure.

FIG. 2 shows a battery cell 200 coupled to a positive electrical connector 202 and a negative electrical connector 204 in accordance with some embodiments of the present disclosure. These connectors may be used on the battery cells shown in FIG. 1. Positive electrical connector 202 may be coupled to a center portion 206 of a second end 212 of battery cell 200. Negative electrical connector 204 may be coupled to a rim portion 208 of second end 212 of battery cell 200. As explained above, the rim portion of the positive face of a battery cell may be electrically coupled to the negative face of the battery cell via the side wall of the battery cell and electrically isolated from the positive face. Accordingly, rim portion 208 of battery cell 200 in FIG. 2 is electrically coupled to first end 214 of the battery cell, which corresponds to the negative face of the battery cell, and is electrically isolated from second end 212 of the battery cell, which corresponds to the positive face of the battery cell. The connectors may be coupled to battery 200 using any suitable technique. For example, the coupling may be an ultrasonic weld, a laser weld, or a fusible link (e.g., a wire bond). Having both the positive and negative connectors on the same end of the battery cell may, for example, be advantageous in simplifying connections to the battery cell. For example, having both connectors on the second end of the battery cell may allow for connections to the battery cell to be made when only the second end (and not the first end) is accessible in a packing configuration. The connectors may be used to connect the battery to a load or to other battery cells, in parallel, series, or a combination thereof. In some embodiments, the connectors are connected to busbars, which are metallic strips used for electrical connections.

Referring back to FIG. 1, while only a single battery is shown on each side of the cooling plate, it should be understood that two or more batteries may be included on each side. The batteries on each side of the cooling plate may be electrically connected in series, parallel, or a combination thereof. The batteries may be connected using the connectors shown in FIG. 2, which may be connected to busbars. In some embodiments, the first battery cells coupled to the first side of the cooling plate may be electrically connected in parallel, and the second battery cells coupled to the second side of the cooling plate may be electrically connected in parallel. In another embodiment, the battery cells on each side of the cooling plate may have subgroups, where the battery cells within each subgroup are electrically connected in parallel, and where the subgroups are electrically connected in series.

Figure 3:
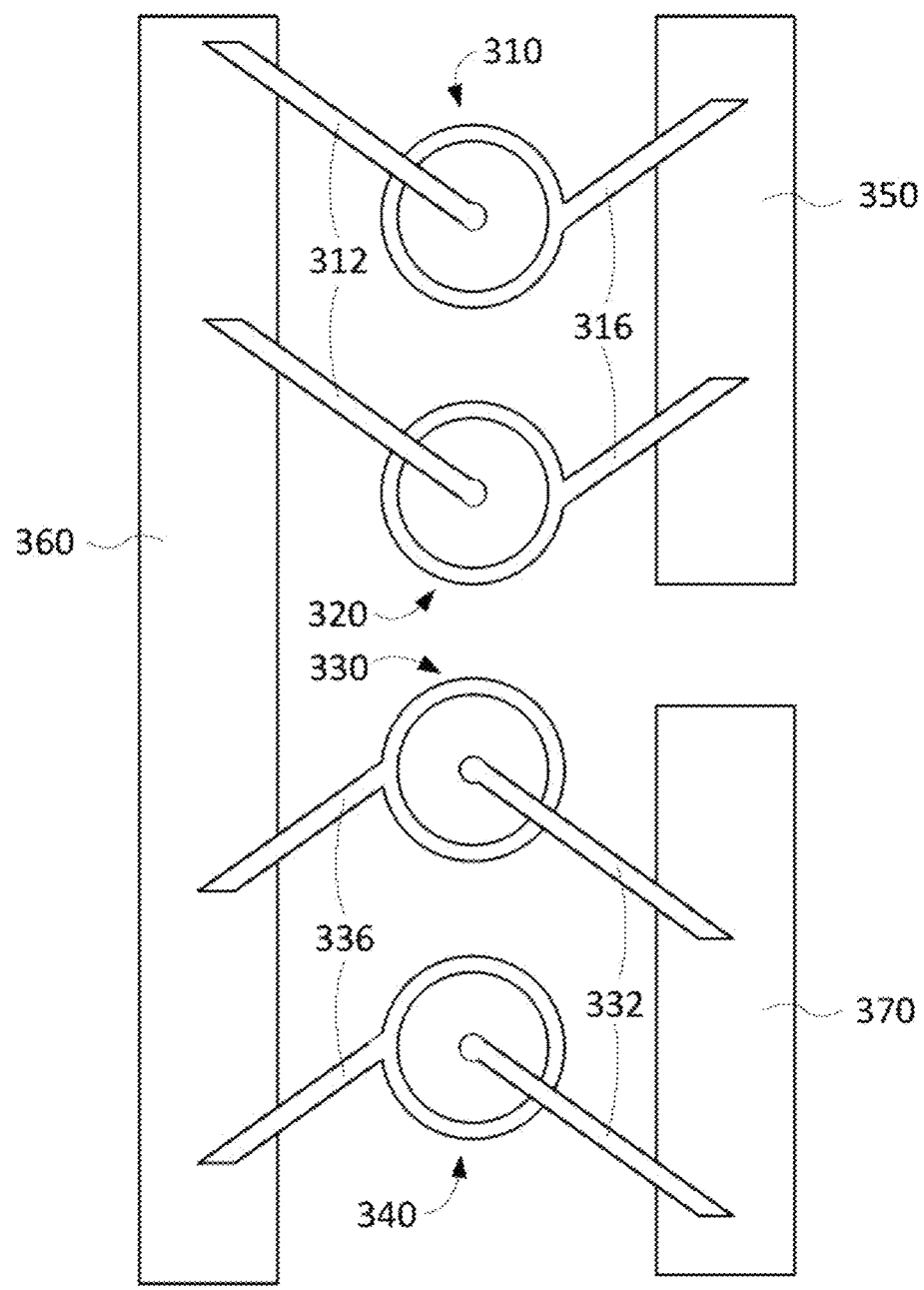
FIG. 3 shows an illustrative battery cell configuration with two subgroups of battery cells in accordance with some embodiments of the present disclosure.

FIG. 3 shows an illustrative battery cell configuration 300 with two subgroups of battery cells in accordance with some embodiments of the present disclosure. The battery cells within the subgroups are coupled to positive and negative electrical connectors. In some embodiments, the connectors and couplings that are used are the same as shown in FIG. 2. The first subgroup comprises battery cells 310 and 320, which have positive electrical connectors 312 connected to first busbar 360 and negative electrical connectors 316 connected to second busbar 350. Accordingly, battery cells 310 and 320 are electrically connected in parallel. The second subgroup comprises battery cells 330 and 340, which have positive electrical connectors 332 connected to third busbar 370 and negative electrical connectors 336 connected to first busbar 360. Accordingly, battery cells 330 and 340 are electrically connected in parallel. As shown, the first subgroup of battery cells 310 and 320 are electrically connected in series with the second subgroup of battery cells 330 and 340 via busbar 360, which electrically connects the positive terminals of the first subgroup to the negative terminals of the second subgroup. It should be understood that this configuration is merely illustrative and any suitable number of battery cells may be used in each subgroup and any suitable number of subgroups may be used. It will also be understood that the configuration shown in FIG. 3 may be used with battery cells coupled to one or both sides of a cooling plate. For example, the configuration of FIG. 3 may be used for battery cells on either side of the cooling plate of FIG. 1. It will also be understood that while the battery cells shown in FIG. 3 are aligned along a line, the battery cells may be arranged in multiple rows of battery cells (e.g., on each side of a cooling plate).

Figure 4:
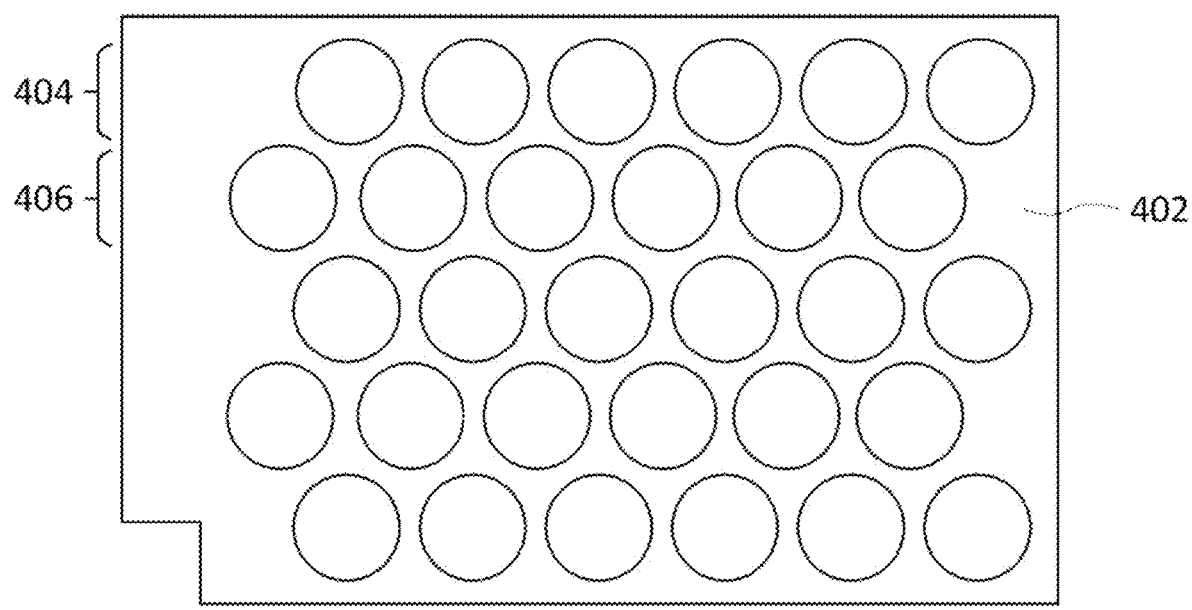
FIG. 4 shows a top view of an arrangement of battery cells on a cooling plate in accordance with some embodiments of the present disclosure.

FIG. 4 shows a top view 400 of an arrangement of battery cells on a cooling plate 402 in accordance with some embodiments of the present disclosure. As described above, the battery cells may be arranged in multiple rows. As shown, 5 rows of battery cells are arranged on cooling plate 402. In some embodiments, the battery cells in each row are offset from the battery cells in the adjacent rows. For example, as shown, a first row 404 and a second adjacent row 406 of battery cells are offset on cooling plate 402. This can be done, for example, to increase packaging density of the battery cells. By using a cooling plate to cool the ends of the battery cells, the battery cells within the same row and between adjacent rows can be positioned relatively close to one another. This enables closer packing than using cooling tubes to cool the sides of the cells. While only one side of the cooling plate is shown in FIG. 4, it should be understood that the same or a similar arrangement may be used on the opposite side of the cooling plate. It will also be understood that the arrangement of battery cells shown in FIG. 4 can be used with cooling plate 120 of FIG. 1.

Figure 5:
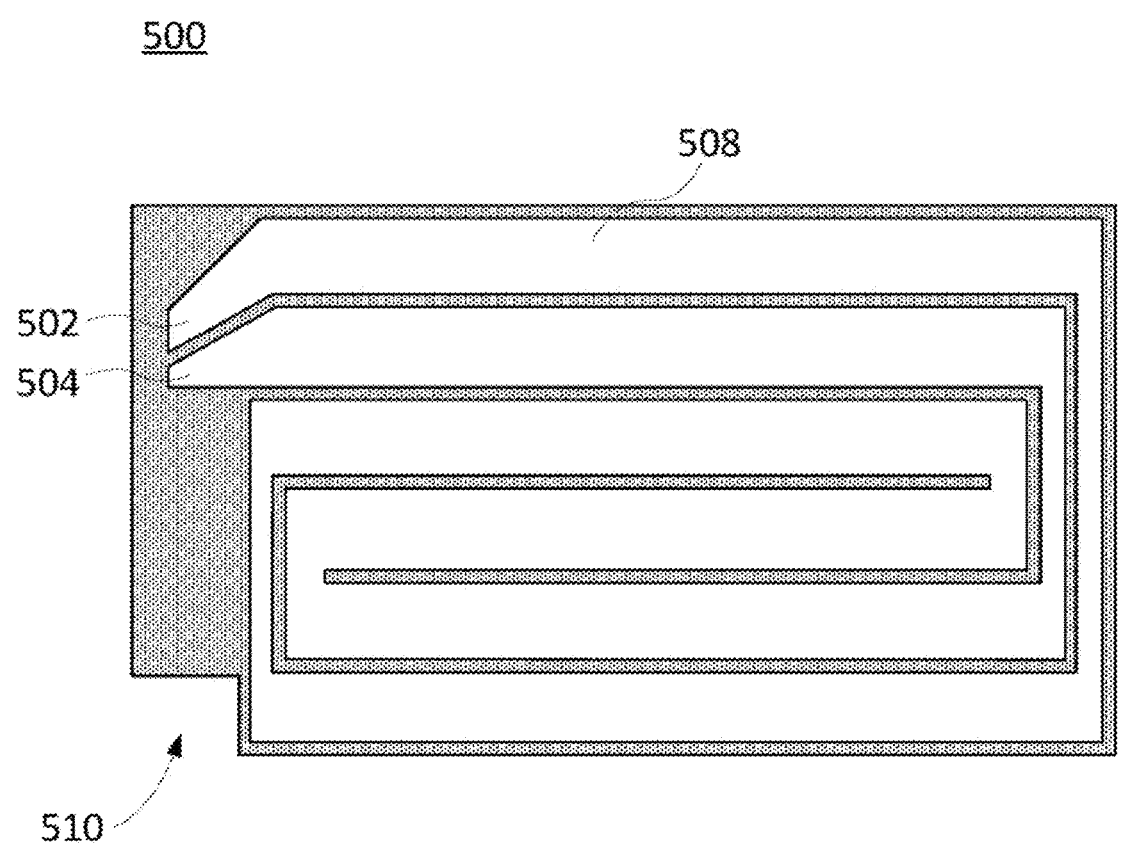
FIG. 5 shows a cross-sectional view through the center of an illustrative cooling plate in accordance with some embodiments of the present disclosure.

FIG. 5 shows a cross-sectional view through the center of an illustrative cooling plate 500 in accordance with some embodiments of the present disclosure. In some embodiments, cooling plate 500 may comprise a generally rectangular shape having four edges, possibly with one or more irregularities in the rectangular shape such as notch 510. In some embodiments, the cooling plate may be a different shape (e.g., square or round) depending on the packaging of the cooling configuration and the available space for batteries. Regions 502 and 504 in the cross-section of the cooling plate may correspond, respectively, to the input port and the output port of the cooling plate, which are not shown but would be on the surface of the cooling plate. There may be one or more channels in the cooling plate for the cooling fluid to travel through, and there may be multiple sets of input and output ports corresponding to the channels. The number of channels, channel configuration, and number of input and output ports may be selected with the goal of minimizing temperature gradient across the cooling plate. For example, cross-flow channels may be selected to provide more even temperature distribution. Cooling plate 500 comprises a channel 508 configured in a "6-pass channel design." Cooling fluid enters the cooling plate at an input port, by region 502, and travels along channel 508 before reaching region 504 and exiting the cooling plate at an output port. The input and output ports need not necessarily be adjacent, though positioning them adjacently may be advantageous in distributing heat across the cooling plate as the cooling fluid moves through the channel. For example, as shown in FIG. 5, the cooling fluid begins traveling through the cooling plate at region 502 in a generally clockwise manner. As the cooling fluid travels through the channel, heat is absorbed, resulting in the cooling fluid becoming more heated as it gets closer to exiting the cooling plate. As shown in FIG. 5, arranging the channel such that the cooling fluid at its hottest (near region 504) is positioned near the cooling fluid at its coolest (near region 502) provides a more consistent temperature throughout the surfaces of the plate, as the temperatures balance each other out. It should be understood that the channel arrangement shown in FIG. 5 is merely illustrative. In another example, there could be multiple linear channels placed horizontally or in another configuration within the cooling plate.

The one or more channels in the cooling plate may be formed in various ways. In some embodiments, the cooling plate may be fabricated from three layers. The bottom and top layers may be solid layers that comprise the surfaces to which the battery cells are coupled, and the middle layer may have portions removed to form the channels. In some embodiments, the plate may be fabricated from two layers. For example, there may be a thicker bottom layer, into which the channels are milled or otherwise formed, in addition to a solid top layer that is glued to the bottom layer.

Figure 6:
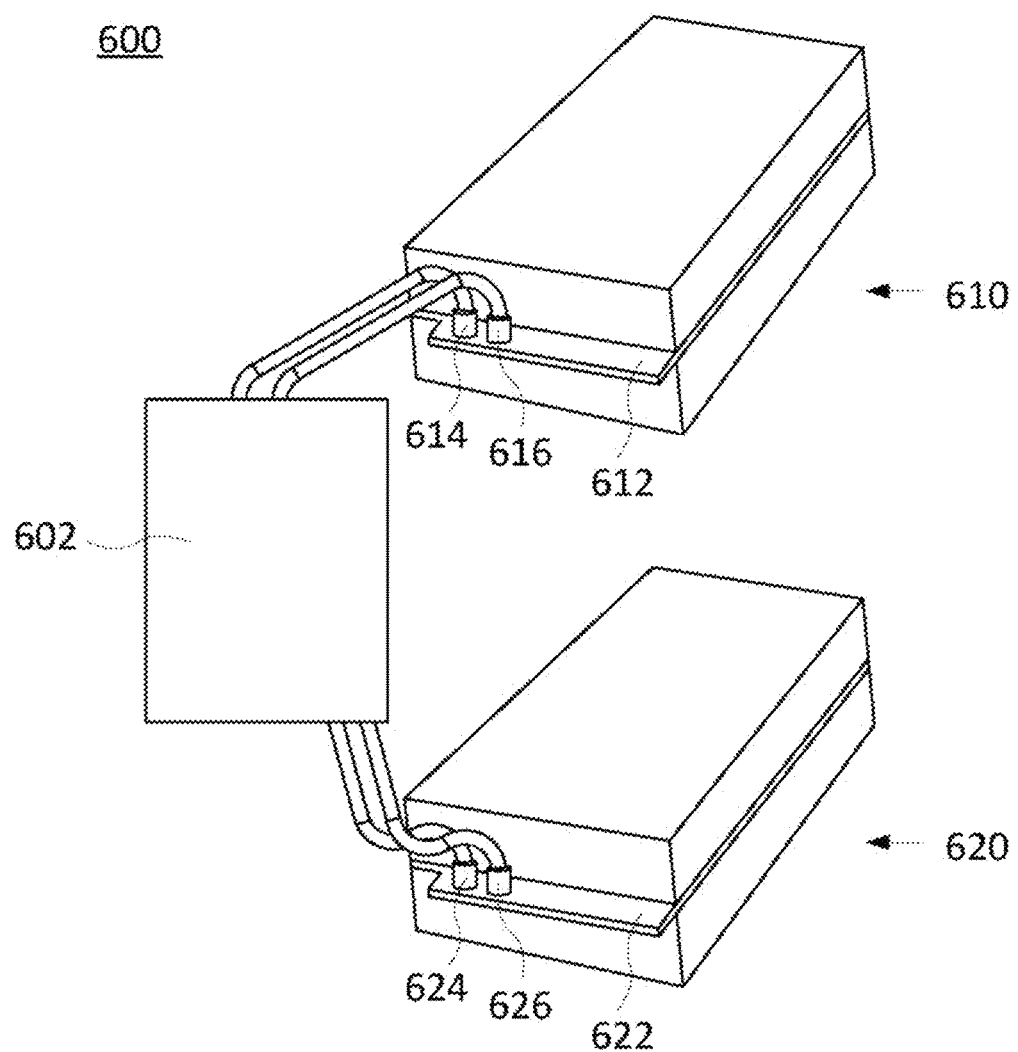
FIG. 6 shows an illustrative configuration of battery modules in accordance with some embodiments of the present disclosure.

The cooling plate and batteries cells of the present disclosure may be included in a battery module. A battery module may comprise other elements, such as extruded aluminum shear walls, which provide rigidity and module mounting. In some applications, multiple battery modules may be electrically connected to form a battery pack. In some embodiments, the cooling plates of two or more battery modules may be coupled in parallel to a source of cooling fluid. This may, for example, minimize the temperature gradient across battery modules by providing each battery module with cooling fluid at about the same temperature. FIG. 6 shows an illustrative configuration 600 of battery modules in accordance with some embodiments of the present disclosure. As shown, battery modules 610 and 620 comprise respective input ports 614 and 624, output ports 616 and 626, and cooling plates 612 and 622. Cooling plates 612 and 622 extend into respective battery modules 610 and 620. Cooling plates 612 and 622 may be any suitable cooling plates such as cooling plate 120 of FIG. 1, cooling plate 402 of FIG. 4, and cooling plate 500 of FIG. 5. One or more battery cells may be coupled to each side of cooling plates 612 and 622 inside of the respective battery module housings. Cooling fluid source 602 may supply cooling fluid to input ports 614 and 624 and collect the discharged cooling fluid from output ports 616 and 626. As an example, the cooling fluid source may be a heat exchanger (e.g., a radiator) located in the front of an electric vehicle configured to discharge heat to the outside air. It should be understood that FIG. 6 is merely illustrative and that any suitable number of battery modules may be used.

Figure 7:
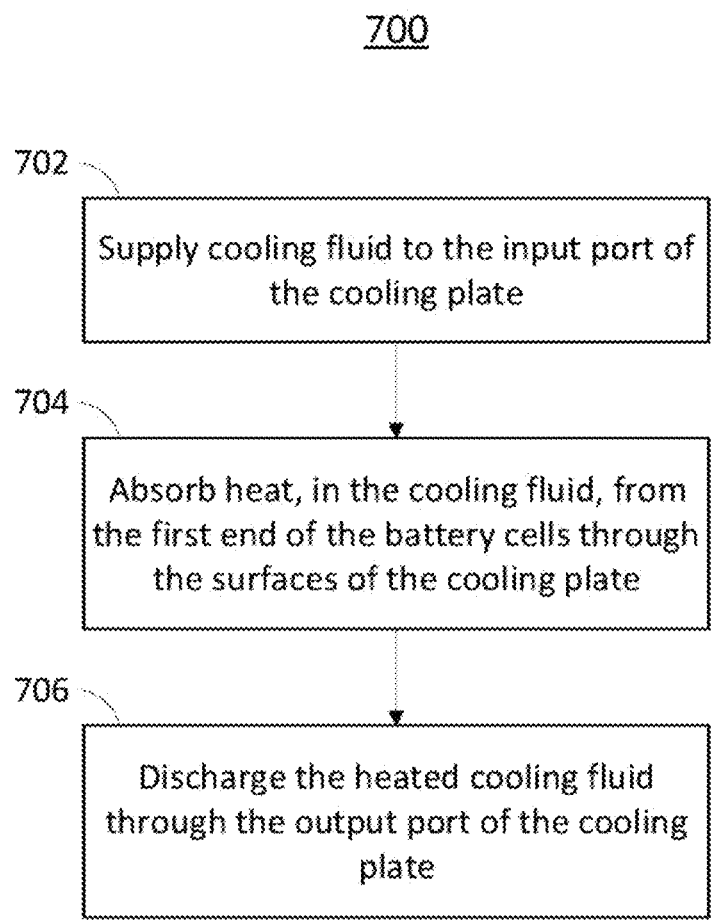
FIG. 7 is a flowchart of a method for operating a battery system in accordance with some embodiments of the present disclosure.

The present disclosure includes methods of operating batteries that use cooling plates to cool the ends of battery cells. FIG. 7 is a flowchart 700 of a method for operating a battery system in accordance with some embodiments of the present disclosure. In some embodiments, the battery system comprises a cooling plate, a first battery cell, and a second battery cell, as shown in FIG. 1. In some embodiments, multiple battery cells are coupled to each side of the cooling plate, as described above with regard to FIGS. 3 and 4. As shown in FIGS. 5 and 6, the cooling plate of the battery system comprises an input port and an output port. At step 702, cooling fluid is supplied to the input port of the cooling plate. As discussed above, the cooling fluid may be supplied by a cooling fluid source such as a heat exchanger or other device. At step 704, heat is absorbed in the cooling fluid from the first ends of the battery cells through the surfaces of the cooling plate, generating heated cooling fluid. For example, the cooling fluid can absorb heat as it passes through channel 508 of FIG. 5. At step 706, the heated cooling fluid is discharged through the output port of the cooling plate. In some embodiments, the cooling fluid is discharged and returns to the cooling fluid source. In some embodiments, the cooling fluid is discharged and returned to a separate device. The method of FIG. 7, which uses a cooling plate to cool the ends of batteries, enables, for example, tightly packed battery cells to be efficiently cooled.

Figure 8:
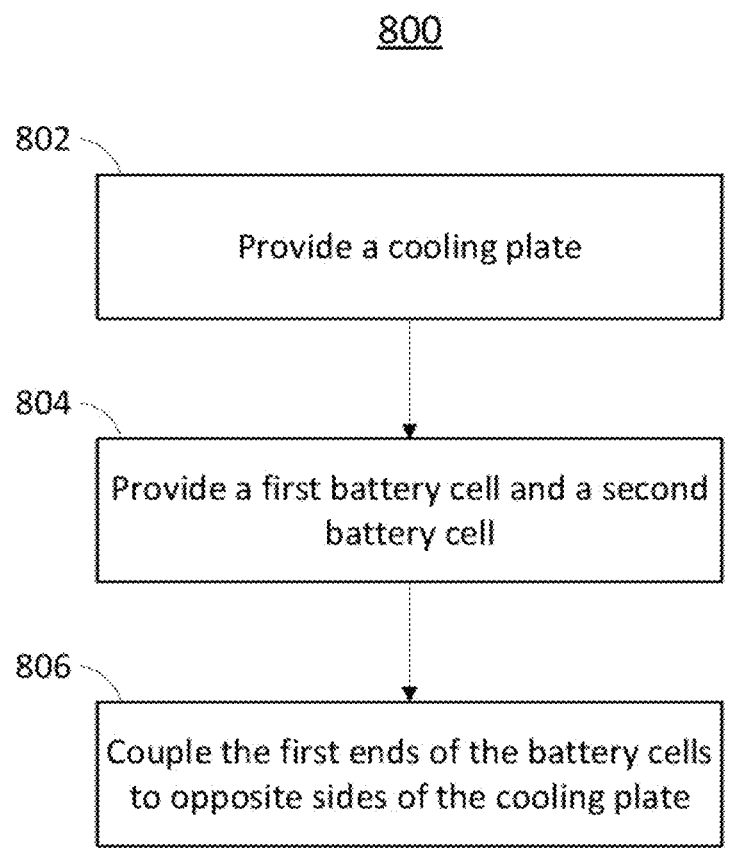
FIG. 8 is a flowchart of a method for manufacturing a battery system to increase volumetric efficiency for cooling in accordance with some embodiments of the present disclosure.

FIG. 8 is a flowchart 800 of a method for manufacturing a battery system to increase volumetric efficiency for cooling. At step 802, a cooling plate with a first side and a second opposite side is provided. The cooling plate may comprise a generally rectangular shape, as shown in FIG. 5, or it may be a different shape, such as round. As shown in FIG. 5, the cooling plate may comprise one or multiple channels for cooling fluid to pass through the plate. At step 804, a first battery cell and a second battery cell are provided. Providing each component may include manufacturing or assembling the component itself, or obtaining the component from a supply of components. As shown in FIG. 1, the first battery cell and second battery cell may each comprise a first end, a second end, and a longitudinal axis passing through the first and second ends. The battery cells may have electrical connectors as shown in FIG. 2 that allow the cells to be arranged in series and parallel configurations (e.g., as shown in FIG. 3). At step 806, the first ends of the first and second battery cells may be coupled to opposite sides of the cooling plate. For example, the first end of the first battery cell may be coupled to the first side of the cooling plate, and the first end of the second battery cell may be coupled to the second side of the cooling plate, where the first and second battery cells are oriented in opposite directions, as shown in FIG. 1. The ends of the battery cells may be coupled to the cooling plate using any suitable coupling element such as an adhesive, a nonconductive shroud, or both. It should be understood that there may be any suitable number of battery cells coupled to the cooling plate. It should also be understood that the cooling plate and coupled battery cells can be included in a battery module to power a load (e.g., an electric vehicle).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery system comprising:
    a cooling plate comprising:
        a first surface and a second surface, the first surface and the second surface being on opposite sides of the cooling plate; and
        an input port and an output port;
    a plurality of first battery cells each comprising a first face adjacent to the first surface of the cooling plate at a first thermal interface; and a plurality of second battery cells each comprising a first face adjacent to the second surface of the cooling plate at a second thermal interface, wherein:
the pluralities of the first and second battery cells are arranged within a housing;
the cooling plate comprise a first rectangular region within the housing and a second region outside of the housing;
the input port and the output port are arranged on the first surface outside of the housing; and
a cooling channel of the cooling plate within the second region narrows towards and is coupled to the input port or the output port.

2. The battery system of claim 1, wherein:
a second end of each first battery cell and each second battery cell comprises a center portion and a rim portion;
the center portion corresponds to a first electrical terminal; and
the rim portion corresponds to a second electrical terminal.

3. The battery system of claim 1, wherein each first battery cell and each second battery cell comprises a cylindrical shape.

4. The battery system of claim 1, wherein the cooling plate comprises a cooling fluid.

5. The battery system of claim 4, wherein:
the cooling fluid enters the cooling plate through the input port and exits the cooling plate through the output port; and
the cooling fluid travels within the cooling plate in the first rectangular region in a clockwise manner and a counter-clockwise manner.

6. The battery system of claim 5, wherein:
the cooling plate comprises a plurality of cooling channels through which the cooling fluid can pass through from the input port to the output port.

7. The battery system of claim 4, further comprising an additional cooling plate configured to cool additional battery cells, wherein the cooling plate and the additional cooling plate are coupled in parallel to a source of the cooling fluid.

8. The battery system of claim 1, wherein a first end of each first battery cell and each second battery cell comprises a negative face and wherein a second end of each first battery cell and each second battery cell comprises a positive face.

9. The battery system of claim 1, wherein each first battery cell comprises a respective vent configured to release gas during a thermal event, and wherein each second battery cell comprises a respective vent configured to release gas during a thermal event.

10. The battery system of claim 1, wherein the plurality of first battery cells are arranged in a first plurality of rows, wherein each row of the first plurality of rows is offset from an adjacent row, wherein the plurality of second battery cells are arranged in a second plurality of rows, and wherein each row of the second plurality of rows is offset from an adjacent row.

11. The battery system of claim 1, wherein the plurality of first battery cells are electrically connected in parallel and wherein the plurality of second battery cells are electrically connected in parallel.

12. The battery system of claim 1, wherein:
the plurality of first battery cells comprises a first plurality of subgroups of first battery cells, wherein the first battery cells in each of the first plurality of subgroups are connected in parallel and wherein the first plurality of subgroups are electrically connected in series; and
the plurality of second battery cells comprises a second plurality of subgroups of second battery cells, wherein the second battery cells in each of the second plurality of subgroups are connected in parallel and wherein the second plurality of subgroups are electrically connected in series.

13. The battery system of claim 1, wherein:
a longitudinal axis of each first battery cell is parallel to a longitudinal axis of each second battery cell; and
the first face of each first battery is spaced apart from the first face of each second battery a distance less than 8 millimeters in a direction parallel to the longitudinal axes of the first and second battery cells.

14. The battery system of claim 1, wherein each first battery cell and each second battery cell comprises a thermal conductivity that is greater in a longitudinal direction than in a direction perpendicular to the longitudinal direction.

15. The battery system of claim 1, wherein:
the cooling channel is a first cooling channel coupled to the input port; and
a second cooling channel of the cooling plate within the second regions narrows towards and is coupled to the output port.

16. The battery system of claim 1, wherein the cooling plate comprises one or more cooling channels formed from three layers.

17. The battery system of claim 1, wherein the cooling channel within the second region comprises an angled side relative to a side of the first rectangular region.

18. A battery system comprising:
a first cooling plate comprising a first port, a second port, a first surface, and a second surface arranged opposite to the first surface;
a plurality of first battery cells arranged on the first surface;
a plurality of second battery cells arranged on the second surface;
a second cooling plate comprising a third port, a fourth port, a third surface, and a fourth surface arranged opposite to the third surface, wherein the third and fourth ports are on the third surface;
a plurality of third battery cells arranged on the third surface;
a plurality of fourth battery cells arranged on the fourth surface; and
a cooling fluid source configured to provide cooling fluid to the first port and the third port, and configured to receive cooling fluid from the second port and the fourth port, wherein:
the pluralities of the first and second battery cells are arranged within a housing;
the first cooling plate comprise a first rectangular region within the housing and a second region outside of the housing;
the first port and the second port are arranged on the first surface outside of the housing; and
a cooling channel of the first cooling plate within the second region narrows towards and is coupled to the first port or the second port.

19. The battery system of claim 18, wherein the cooling fluid source comprises a heat exchanger.

20. The battery system of claim 18, wherein:
the plurality of first battery cells each comprises a first end, a second end, and a longitudinal axis passing through the first end and second end of each first battery cell, wherein the first end of each first battery cell comprises a first face, and wherein the first face of each first battery cell is adjacent to the first surface of the first cooling plate at a first thermal interface; and the plurality of second battery cells each comprises a first end, a second end, and a longitudinal axis passing through the first end and second end of each second battery cell, wherein the first end of each second battery cell comprises a first face, wherein the first face of each second battery cell is adjacent to the second surface of the first cooling plate at a second thermal interface, wherein the plurality of first battery cells are oriented in opposite directions from the plurality of second battery cells.

21. The battery system of claim 20, wherein:

the second end of each first battery cell and each second battery cell comprises a center portion and a rim portion;

the center portion corresponds to a first electrical terminal; and the rim portion corresponds to a second electrical terminal.

22. The battery system of claim 18, wherein each first battery cell, each second battery cell, each third battery cell, and each fourth battery cell comprises a cylindrical shape.

23. The battery system of claim 18, wherein the plurality of first, second, third, and fourth battery cells are electrically connected to form a battery pack.

\* \* \* \* \*